United States Patent [19]

Shafer

[11] Patent Number: 5,031,976

[45] Date of Patent: Jul. 16, 1991

[54] CATADIOPTRIC IMAGING SYSTEM

[75] Inventor: David Shafer, Fairfield, Conn.

[73] Assignee: KLA Instruments, Corporation, San Jose, Calif.

[21] Appl. No.: 587,310

[22] Filed: Sep. 24, 1990

[51] Int. Cl.$^5$ .................. G02B 17/08; G02B 13/14
[52] U.S. Cl. ............................ 350/1.2; 350/442; 350/444; 350/446
[58] Field of Search ............... 350/1.2, 1.3, 1.4, 442, 350/444, 445, 446

[56] References Cited

U.S. PATENT DOCUMENTS

| | | | |
|---|---|---|---|
| 3,296,443 | 1/1967 | Argyle | 350/1.3 |
| 3,371,212 | 2/1968 | Weiss | 350/1.3 |
| 3,927,254 | 12/1975 | Lessman | 350/1.3 |
| 4,411,499 | 10/1983 | Abel et al. | 350/442 |
| 4,432,596 | 2/1984 | Campbell et al. | 350/1.3 |
| 4,779,966 | 10/1988 | Friedman | 350/1.2 |

Primary Examiner—Bruce Y. Arnold
Assistant Examiner—Martin Lerner
Attorney, Agent, or Firm—Rosenblum, Parish & Bacigalupi

[57] ABSTRACT

An improved catadioptric imaging system is presented which produces a flat accessible final image, and is particularly effective at high speed in the deep ultraviolet spectral range. The lenses of the system are formed from a single glass type, fused silica. A first group of lenses serves as an aberration corrector group. A single focusing lens focuses light, transmitted through the corrector group, forming an intermediate image at a predetermined position within the system. A separate field lens is placed at the intermediate image point, and focuses the light transmitted thereto through a hole in the center of a spherical mirror. The light then travels through a separate thick lens element and is subsequently reflected by a planar mirror back through the thick lens and towards the concave reflective side of the spherical mirror. The spherical mirror thereafter reflects this incident light, focusing it through a hole in the center of the planar mirror and to a final imaging point outside of the system.

25 Claims, 2 Drawing Sheets

CATADIOPTRIC IMAGING SYSTEM

BACKGROUND OF THE INVENTION

1. Field of the Invention

The present invention relates generally to optical imaging systems, and more particularly to a catadioptric imaging system which exhibits good performance at high speed, utilizing a single refractive material type best suited for broad-band ultraviolet applications.

2. Brief Description of the Prior Art

In today's technologically oriented society, a demand has developed for ultra-accurate precision optical instruments and imaging systems. These systems are used in a multitude of applications and must often operate effectively and efficiently over a relatively broad spectral range. In order to accommodate optical functionality, very expensive precision lenses are often used in a variety of complex and functionally limited combinations. The success of these systems has been marginal and oftentimes includes a capital commitment which is effectively cost prohibitive.

A fundamental problem arises which prevents an all-refractive optical system from achieving a broad spectral range with good performance at high speed. That problem is secondary and tertiary color, which is a chromatic variation in focus. In order to compensate for this problem, and maintain an essentially constant focus over a broad ultraviolet range, at least three different types of optical glass normally have to be used, each with a special characteristic dispersion property.

Unfortunately, there is only one optimum optical material that transmits well deep into the ultraviolet, and that is fused silica. Other materials which transmit well, such as calcium fluoride and lithium fluoride, have very undesirable physical properties, such as being soft, difficult to polish, expensive, and susceptible to thermal shock. More importantly, the dispersion properties of calcium fluoride and lithium fluoride are not different enough from that of fused silica to be very useful for achromatising a lens design, and not different enough from each other to be very useful for correcting secondary and tertiary color.

In order to produce an operative broad-band deep-ultraviolet, all-refractive design, for a fast speed objective, an extremely large number of lens elements would be required. Even if this arrangement could be achieved, it is doubtful that the focus constancy could be maintained over a really broad spectral range. Additionally, it would be extremely difficult to correct chromatic variation of aberrations over this range.

An alternative to an all-refractive design is a catadioptric design, which utilizes both lenses and mirrors wherein most of the focusing power of the optical system is due to spherical mirrors. This arrangement greatly diminishes the work done by the lenses, and allows easier control of their color effects. Although a design involving only mirrors would be optimal (because it would work equally well at any wavelength), aspheric mirrors are very difficult to make to the requisite accuracy, and spherical mirrors invariably have three major design defects they are not capable of good performance at fast speeds; they have a large amount of obscuration; and, they produce a strongly curved image.

Prior art catadioptric imaging systems provide a partial solution to these problems, however, several critical tradeoffs are made. First, these systems ultimately produce a strongly curved final image, which is an undesirable quality in any optical system. Furthermore, these systems continue to be constructed using lenses formed from multiple refractive material types. As suggested above, this severely limits the broad-band ultraviolet imaging capabilities of the system. Additionally, a further significant design problem with the prior art catadioptric systems is that major obscurations are produced, which effectively reduce the amount of transmitted light amenable to the system in forming a final image.

SUMMARY OF THE PRESENT INVENTION

It is, therefore, an object of the present invention to provide a catadioptric imaging system which can be used over a broad spectral range, especially well into the deep ultraviolet, with good performance at high speed.

It is another object of the present invention to provide a system of the type described wherein the various functional components are configured to correct for secondary and tertiary chromatic variations in focus.

It is another object of the present invention to provide a system of the type described wherein a single type of refractive material can be used in the production of all of the lens elements.

It is another object of the present invention to provide a system of the type described wherein the various functional components are configured such that a minimal amount of obscuration is produced.

It is a further object of the present invention to provide a system of the type described which is configured such that chromatic variation of coma and stigmatism are corrected.

It is a still further object of the present invention to provide a system of the type described which produces an accessible and flat final image.

Briefly, these and other objects of the present invention are achieved by properly configuring the separate components of a catadioptric imaging system to interact with incident light in a precise predetermined manner. The lenses of the system are formed from a single glass type, and a first group of these lenses functions as an aberration corrector group. A single focusing lens focuses light transmitted through this correction group, and forms an intermediate image at a predetermined position within the system. A separate field lens is placed at this intermediate image position and focuses light transmitted thereto through a hole in the center of a spherical mirror. The light then travels through a separate thick lens element and is subsequently reflected by a planar mirror back through the thick lens and towards the concave reflective side of the spherical mirror. The spherical mirror reflects this light, focusing it through a hole in the center of the planar mirror and to a final imaging point outside of the system.

Several advantages are achieved with the system of the preferred embodiment. First, using a single glass type to form each of the lenses facilitates production of an imaging system which utilizes the single best refractive material for broad-band ultraviolet applications.

Another advantage is that the system exhibits excellent performance at high speed.

Other significant advantages of the present system are the corrections made thereby for primary, secondary and tertiary chromatic variations in focus, as well as the corrections made for the chromatic variations of coma and astigmatism.

An additional important advantage of the present system is that a flat final image is produced which is conveniently accessible, and thus readily available for practical applications.

There has been outlined rather broadly the more important features of the invention in order that the detailed description thereof that follows may be better understood, and in order that the present contribution in the art may be better appreciated. There are, of course, additional features of the invention that will be described more fully hereinafter. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

IN THE DRAWING

DETAILED DESCRIPTION OF THE PREFERRED EMBODIMENT

Figure 1:
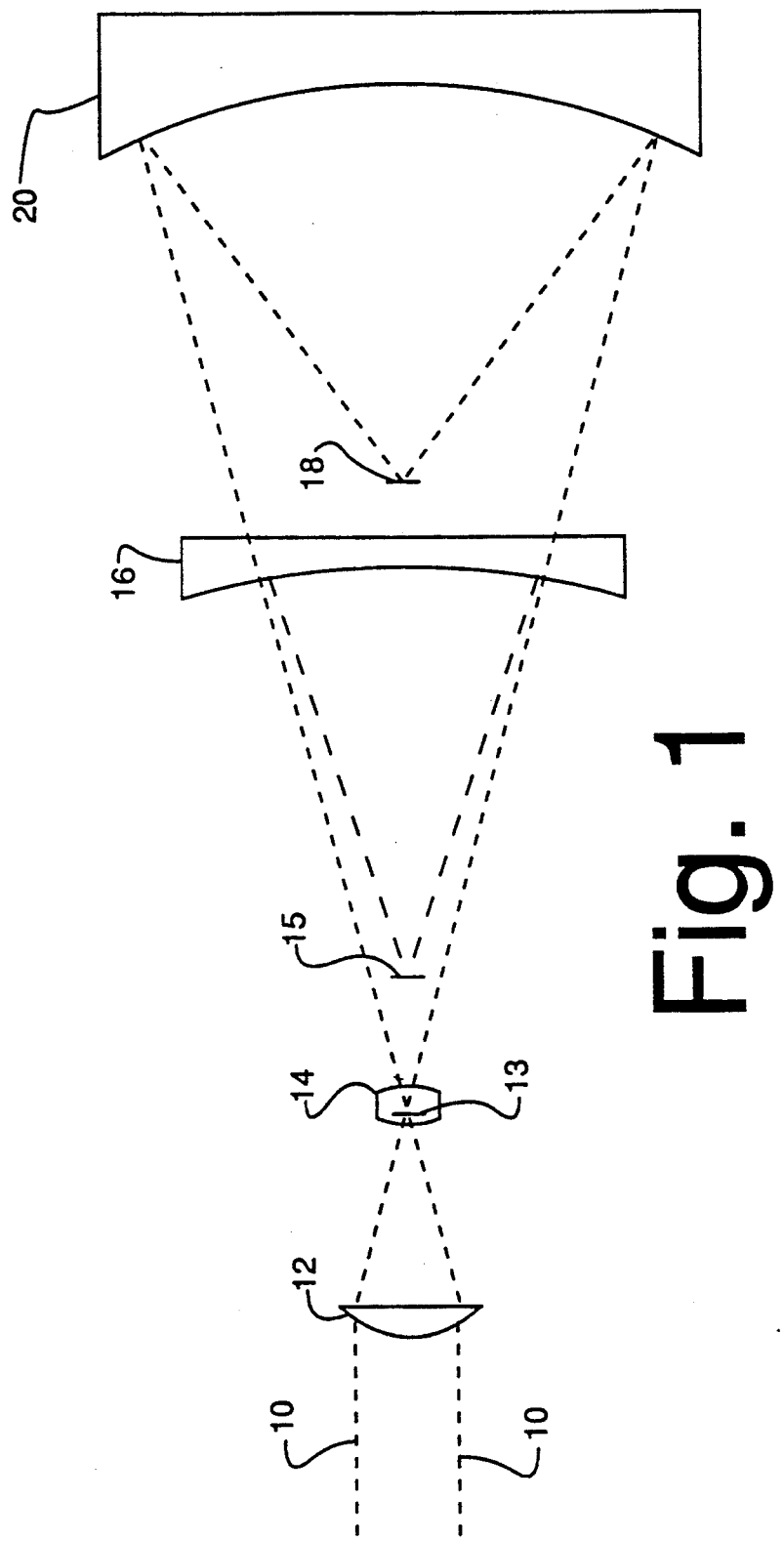
FIG. 1 is an elevational view illustrating the component configuration of the theoretical catadioptric imaging system which forms the basis for the preferred embodiment of the present invention.

Referring to FIG. 1, shown is a figure illustrating the interaction between incident light rays 10 and an optical system configured to illustrate the theoretical operation of the preferred embodiment. This system forms the basis for the design of the preferred embodiment, and is effective to provide very good correction of focus and aberrations over a broad spectral region. Additionally, this system exhibits an unusually small amount of obscuration, and utilizes only one type of refractive material.

As shown, a first lens 12, formed from fused silica and having a substantially positive power, is disposed at a predetermined primary position within the system and is operative to gather incident light 10 and focally produce an intermediate image, uncorrected for color, at an intermediate image point 13 within the focal path of the system. A second lens 16, also formed from fused silica, is disposed in a predetermined position within the focal path of the system and is designed and formed to function in conjunction with lens 12 to correct the primary longitudinal color of the system. That is, the power of lens 12 and lens 16, and the spacing therebetween, are specifically chosen to correct primary longitudinal color, thus leaving only a very small amount of residual secondary longitudinal color. A virtual image 15 is produced within the optical path between lens 14 and lens 16, as shown.

By placing a third lens 14 between the first lens 12 and the second lens 16, at the intermediate image point 13, residual secondary longitudinal color can also be corrected. Specifically, the power of the lens placed at the intermediate image point affects the amount of residual secondary color in the system. The power of lens 14 is thus chosen to effectively completely eliminate this secondary longitudinal color for the whole system. This leaves only a small amount of residual tertiary color within the system.

Prior art theory showed that this tertiary color could be corrected if the field lens 14 at the intermediate image is made an achromatic doublet, so that it has no color of its own. However, this would require the use of two different glass types, which, as described above, is undesirable for the applications of the present system. In the present design, it was found that a single-element field lens could be used to achieve the same overall result.

By moving lens 14 slightly away from the intermediate image, and re-optimizing the design of the system to eliminate primary and secondary longitudinal color, the residual tertiary color can be changed. The residual tertiary color is better when field lens 14 is moved to one side of the intermediate image, and worse when it is moved to the other side. Thus, by choosing the proper location for lens 14, and the proper lens powers and relative spacings for all of the system lenses, it is possible to eliminate tertiary color completely, all with the use of lenses formed from the single element, fused silica. This allows an extremely broad spectral range to be covered, especially down into the deep ultraviolet, without any significant focus shift and using just one refractive material type.

After being transmitted through lens 16, light 10 is then reflected by a spherical mirror 20 and focused thereby upon a final image point 18. As can be seen by reference to FIG. 1, this final image position is inconveniently located and permits only limited access for practical imaging applications. However, this inconvenience has been obviated by the design of the preferred embodiment, as described in further detail below.

Figure 2:
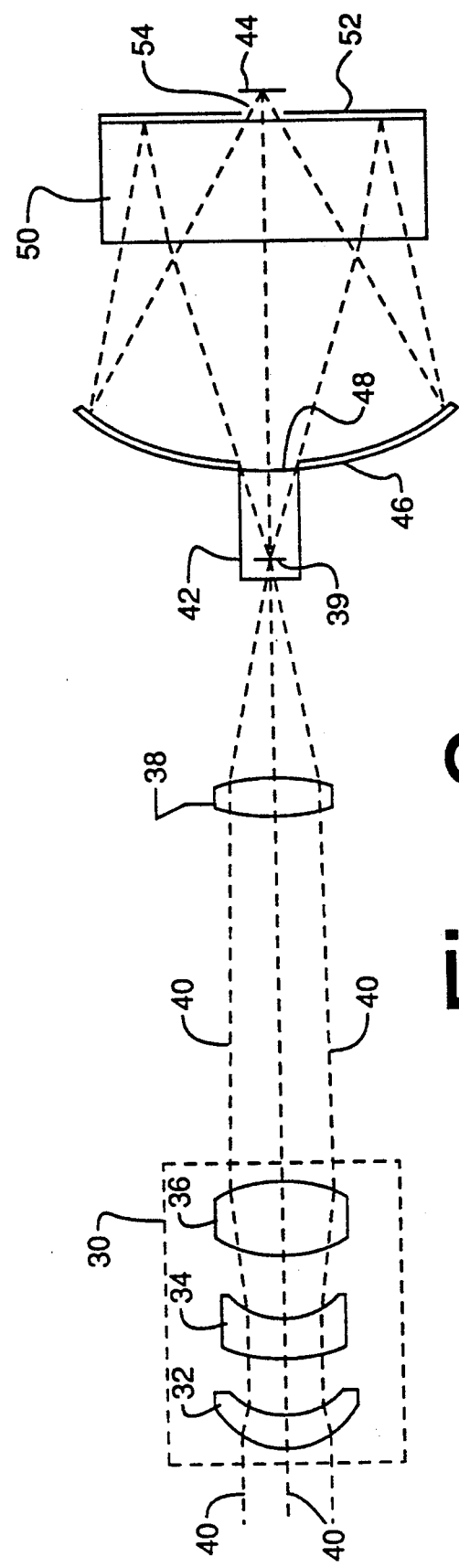
FIG. 2 is an elevational view showing the interrelationships between the various components of the preferred embodiment and their interaction with incident light.

Referring now to FIG. 2, illustrated is the interaction between incident light rays 40 and the various components of a catadioptric imaging system comprising the preferred embodiment of the present invention. As described above, this system incorporates the theoretical functional design of the system as shown in FIG. 1. However, additional components have been added, both to further enhance the optical accuracy of the system over a broad spectral range and to present a final image which is conveniently accessible.

A first series of lenses forms an aberration corrector group 30, which is not present in the exemplary system shown in FIG. 1. These additional lens elements are necessary to provide high levels of correction for aberrations and chromatic variation of aberrations, including coma and astigmatism, which are necessary in order to achieve a good broad-band coverage over the whole field of view. These two latter aberrations, chromatic variation of coma and astigmatism, are extremely difficult to control, and the design of the present invention is the only functional embodiment that simultaneously corrects all of these aberrations, chromatic variations in aberrations, and focus shifts, using just a single glass type in lens construction. Group 30 includes lens 32, lens 34, and lens 36, all of which are composed of fused silica. Each lens is of a predetermined shape, power and spacing, relative to the other lenses of group 30, such that the above-described corrections are effectively facilitated.

A focusing lens 38, which corresponds to lens 12 of FIG. 1, is formed from fused silica, and is disposed within the optical path of light rays 40 transmitted through corrector group 30. Lens 38 has a substantially positive power and is operative to focus rays 40 at an intermediate image point 39 within the system. A lens 50, which is also formed from fused silica and described in further detail below, corresponds to lens 16 of FIG. 1 and operates to correct the primary longitudinal color of the system in conjunction with lens 38. That is, the powers of lens 38 and lens 50 and the spacing therebetween are specifically chosen to correct the primary longitudinal color of the system. As described above in relation to FIG. 1, this leaves only a very small amount of residual secondary longitudinal color.

A lens 42, also formed from fused silica, is disposed within the system partially displaced from the intermediate image point 39, formed by lens 38, and is constructed and positioned such that, in conjunction with the other lenses 38 and 50 of the system, light passing therethrough is corrected for secondary and tertiary color. That is, as in the theoretical example in FIG. 1, field lens 42 is designed to a power which completely eliminates secondary longitudinal color in the system. Additionally, lens 42 is positioned within the optical path relative to the intermediate image point 39, and the powers, positions and spacings of the other lens elements are determined, such that tertiary color is effectively completely eliminated.

Referring to FIG. 2, it can be seen that intermediate image point 39 is offset relative to the central portion of lens element 42. This corresponds to the concept presented in the theoretical example of FIG. 1 wherein lens 14 (lens 42 in FIG. 2) is to be offset relative to intermediate image point 13 (point 39 in FIG. 2). The relative offset of lens 42 in the preferred embodiment of FIG. 2 effectively eliminates the residual tertiary color of the system.

The inconvenient location of the final image in FIG. 1 has been obviated by the design of the preferred embodiment such that the final image becomes completely accessible. This is achieved by the inclusion of an additional reflection into the design such that the final image 44 is located outside of the system. A spherical mirror 46, having a circular opening 48 concentric with its optical axis, is disposed within the optical path of the system such that lens 42, which is slightly displaced from intermediate image point 39, is positioned within hole 48. This allows light rays 40 to be transmitted through the center of mirror 46 via lens 42.

Rays 40 emerging from lens 42 subsequently traverse lens element 50 and are reflected back towards the reflective surface of spherical mirror 46 by a planar mirror 52. Planar mirror 52 is actually a thin reflective coating which is applied to the external surface of the back side of lens 50, opposite the reflective surface of mirror 46. A hole 54 is provided through the center of mirror 52 and allows light to be transmitted therethrough, as described below.

Spherical mirror 46 and planar mirror 52 are oriented such that an incident light ray, emanating from lens 42, is reflected once by planar mirror 52, and then once by spherical mirror 46 which focally transmits the ray through hole 54 and to a final image point 44. As can be seen by reference to FIG. 2, light rays 40 will pass through lens 50 a total of three times before exiting through hole 54 and being focused at final image point 44. This produces a very beneficial physical design consequence, as described below.

It was found in the theoretical design illustrated in FIG. 1 that, by having the glass element 16 (shown in FIG. 1) be thick, it is possible to eliminate the weak negative power of the lens, and have it just be a thick parallel plate. By placing reflective coating 52 on lens 50 (which corresponds to lens 16 in FIG. 1), and causing the light path of an incident ray to travel through lens 50 three times, due to the above-described reflections, lens 50 can be physically much thinner than its unfolded glass path counterpart would need to be, and its inherent weak negative power is still effectively eliminated. This, of course, facilitates both the efficient construction and implementation of the lens within the system by greatly reducing its actual requisite thickness.

This arrangement also allows mirror 52 to be very thin, since it is merely a reflective coating on the thick glass element 50. As a consequence, the working distance/obscuration trade-off of the system can be explored without having to be concerned with providing a realistic thickness for the fold mirror, which would be required if it were a separate mirror element.

An additional important feature realized by making coating 52 very thin, and facilitated by the entire design configuration, is the resulting small overall obscuration of the system as compared to the prior art devices. That is, both hole 48 in mirror 46, and hole 54 in mirror 52 have relatively small diameters, and, thus, cause only minimal obscuration of incident and transmitted light. Specifically, because mirror 52 comprises a very thin reflective coating, hole 54 through the center thereof can have a very small diameter, which results in a very small obscuration. This provides obvious system benefits, considering that more incident light will be transmitted to the final image point 44 using such a design.

The following table includes specific measurements of the variable quantities included in the design of the preferred embodiment of the present invention. The table is organized such that surface #1 corresponds to the outer surface of lens 32 (shown in FIG. 2) facing indicent rays 40, surface #2 corresponds to the outer surface of lens 32 opposite surface #1, surface #3 corresponds to the outer surface of lens 34 facing surface #2, and so on. The thickness column includes measurement between each juxtaposed surface, and the material column includes the type of material incident light traverses in traveling from one surface to the next. For example, the distance between surfaces #1 and #2 is 2 mm, and light travels through fused silica for this distance. The distance between surfaces #2 and #3 is 2 mm, and light travels through air for this distance. All measurements are provided to further describe in detail the preferred embodiment. These figures should not be considered as limitations on the system design.

Lens Data

| Surface | Radius | Thickness | Material |
| --- | --- | --- | --- |
| #1 | 5.981 mm | 2.000 mm | fused silica |
| #2 | 6.048 mm | 2.000 mm | air |
| #3 | 67.964 mm | 2.000 mm | fused silica |
| #4 | 5.684 mm | 4.374 mm | air |
| #5 | 19.777 mm | 2.755 mm | fused silica |
| #6 | −13.976 mm | 20.986 mm | air |
| #7 | 7.344 mm | 2.000 mm | fused silica |
| #8 | −31.194 mm | 7.702 mm | air |
| #9 | 3.960 mm | 7.182 mm | fused silica |
| #10 | 8.305 mm | 12.371 mm | air |
| #11 | 142.672 mm | 5.961 mm | fused silica |
| #12 | flat | −5.961 mm | fused silica (reflection) |
| #13 | 142.672 mm | −12.371 mm | air |
| #14 | 23.611 mm | 12.371 mm | reflection |
| #15 | 142.672 mm | 5.961 mm | fused silica |

-continued

Lens Data

| Surface | Radius | Thickness | Material |
|---------|--------|-----------|----------|
| #16 | flat | 0.499 mm | air |

Note: Aperture stop is on surface #14.

Whereas the preferred embodiment of the present invention has been described above, it is contemplated that other alternatives and modifications may become apparent to those skilled in the art after having read the above disclosure. It is therefore intended that the appended claims be interpreted as covering all such alterations and modifications as fall within the true spirit and scope of the invention.

What is claimed is:

1. A catadioptric imaging system, especially suited for use in broad-band ultraviolet applications, comprising:
    an aberration corrector means disposed at the entrance end of said system and including a plurality of lens elements, all formed from a single refractive material type, for providing high levels of correction for aberrations and chromatic variation of aberrations of light within said system;
    a first focusing lens element, formed from said refractive material type and disposed at a first predetermined position along an optical path of said system, for focusing light received from said corrector means at an intermediate image point along said path;
    a second lens element, formed from said refractive material type and disposed at a second predetermined position along said optical path subsequent to said first focusing lens element and said intermediate image point, said second lens element being operative to act in conjunction with said first focusing lens element to correct primary longitudinal color of light within said system;
    a third field lens element, formed from said refractive material type and disposed at a third predetermined position along said optical path between said first and second lens elements, for correcting secondary longitudinal color of light passing through said system, and further disposed relative to said intermediate image point such that tertiary longitudinal color is also corrected within said system;
    a planar mirror element, disposed along said path at the exit end of said system and having a small exit aperture formed therein, for reflecting light transmitted thereto through said second lens element; and,
    a spherical mirror element, disposed at a fourth predetermined position along said path between said third position and said second position, and having a centrally disposed hole therein, whereby light transmitted by said third lens element passes through said hole, then a first time through said second lens element to said planar mirror element, whereupon it is reflected back a second time through said second lens element to said spherical mirror element and subsequently reflected thereby through said second lens element a third time and through said exit aperture whereby a focused image is produced at a final image point.

2. The system as described in claim 1 wherein said single refractive material type is fused silica.

3. The system as described in claim 2 wherein said third field lens element has a positive power.

4. The system as described in claim 2 wherein said planar mirror element includes a thin reflective coating applied to the outer surface of said second lens element.

5. A catadioptric imaging system especially suited for use in broad-band ultraviolet applications, comprising:
    a first focusing lens element, formed from a single refractive material type, and disposed at a first predetermined position along an optical path of said system, for focusing light, incident upon said lens, at an intermediate image point along said path;
    a second lens element, formed from said refractive material type, and disposed at a second predetermined position along said optical path subsequent to said first lens element and said intermediate image point, said second lens element being operative to act in conjunction with said first lens element to correct primary longitudinal color of light within said system;
    a third field lens element, formed from said refractive material type and disposed at a third predetermined position along said optical path between said first and second lens elements, for correcting secondary longitudinal color of light within said system, and further disposed a predetermined distance from said intermediate image point such that tertiary longitudinal color of light within said system is also corrected;
    a planar mirror element, disposed at the exit end of said system and along said path, for reflecting light transmitted thereto through said second lens element, said planar mirror element having a first hole centrally therethrough whereby light can be focused through said first hole to a final image point outside of said system; and
    a spherical mirror element, disposed at a fourth predetermined position along said path between said third lens element and said second lens element, and having a second hole centrally therethrough, whereby light transmitted through said third lens element passes through said spherical mirror element via said second hole, said spherical mirror element being operative to reflect and focus light reflected by said planar mirror element through said first hole in said planar mirror element and to said final image point.

6. The system as described in claim 5 wherein said single refractive material type is fused silica.

7. The system as described in claim 6 wherein said third field lens element has a positive power.

8. The system as described in claim 6 wherein said planar mirror element is a thin reflective coating applied to the outer surface of said second lens element.

9. The system as described in claim 5 further comprising:
    an aberration correction means disposed at the entrance end of said system and including a plurality of lens elements, all formed from said refractive material type, for providing high levels of correction for aberrations and chromatic variation of aberrations of light within said system.

10. The system as described in claim 9 wherein said single refractive material type is fused silica.

11. The system as described in claim 10 wherein said third field lens element has a positive power.

12. The system as described in claim 10 wherein said planar mirror element is a thin reflective coating applied to the outer surface of said second lens element.

13. A method for imaging a broad spectral range of light at fast speed, using only one refractive material, comprising the steps of:

positioning a first focusing lens element, formed from said single refractive material type, at a first predetermined position within an optical system, whereby incident light is focused thereby at a predetermined intermediate image point within said system;

positioning a second lens element, formed from said refractive material type, at a second predetermined position within said system subsequent to said first focusing lens element and said intermediate image point, said second lens element being operative to act in conjunction with said first lens element to correct primary longitudinal color of light within said system;

positioning a third field lens element, formed from said refractive material, at a third predetermined position within said system between said first and second lens elements, said third field lens element being operative to act in conjunction with said first and second lens elements to correct light within said system for secondary longitudinal color;

positioning a planar mirror element, having a small exit aperture formed therethrough, at the exit end of said system for reflecting light transmitted thereto through said second lens element;

positioning a spherical mirror element, having a centrally disposed hole therethrough, between said second and third lens elements whereby said light transmitted through said third lens element passes through said hole in said spherical mirror element, then through said second field lens element, and is subsequently reflected by said planar mirror element to the concave reflective surface of said spherical mirror element, whereby said light is subsequently reflectively focused through said first hole in said planar mirror element and to said final image point.

14. The method as described in claim 13 wherein said third field lens element is further positioned a predetermined distance relative to said intermediate image point, whereby tertiary color of light within said system is corrected.

15. The method as described in claim 14 wherein said single refractive material type is fused silica.

16. The method as described in claim 15 wherein said third lens element has a positive power.

17. The method as described in claim 15 wherein said planar mirror element is a thin reflective coating applied to the outer surface of said second lens element.

18. The method as described in claim 13 wherein said single refractive material type is fused silica.

19. The method as described in claim 18 wherein said third lens element has a positive power.

20. The method as described in claim 18 wherein said planar mirror element is a thin reflective coating applied to the outer surface of said second field lens element.

21. The method as described in claim 13 further comprising the step of positioning an aberration correction means, including lenses formed from said refractive material, within said system for providing high levels of correction for aberrations and chromatic variation of aberrations of light therein.

22. The method as described in claim 21 wherein said aberration correction means is positioned in a primary position with respect to the other elements of said system, such that light first passes through said correction means before being transmitted to said first lens element.

23. The method as described in claim 21 wherein said single refractive material type is fused silica.

24. The method as described in claim 23 wherein said third field lens element has a positive power.

25. The method as described in claim 23 wherein said planar mirror element is a thin reflective coating applied to the outer surface of said second lens element.

* * * * *